United States Patent [19]

Yamashita

[11] Patent Number: 5,265,849
[45] Date of Patent: Nov. 30, 1993

[54] PLATE CUTTING DEVICE

[75] Inventor: Masao Yamashita, Chiba, Japan

[73] Assignee: Koike Sanso Kogyo Kabushiki Kaisha, Tokyo, Japan

[21] Appl. No.: 931,939

[22] Filed: Aug. 19, 1992

[51] Int. Cl.$^5$ .............................................. B23K 7/10
[52] U.S. Cl. .......................................... 266/77; 266/48
[58] Field of Search ............................. 266/48, 72, 77

[56] References Cited

U.S. PATENT DOCUMENTS

| | | | |
|---|---|---|---|
| 3,388,901 | 6/1968 | Fergurson | 266/77 |
| 4,006,890 | 2/1976 | Vainer et al. | 266/77 |
| 4,205,828 | 6/1980 | Hooper et al. | 266/77 |
| 4,256,288 | 3/1981 | Rojas | 266/72 |

Primary Examiner—Scott Kastler
Attorney, Agent, or Firm—Fitzpatrick, Cella, Harper & Scinto

[57] ABSTRACT

A plate cutting device having a cutting member for cutting a workpiece vertically or aslant comprises a stand and the cutting member coupled with a hose or a cord, an end of the hose or cord being connected to a part of said stand. An inclining device for inclining the cutting member about an axis parallel to a cutting direction is provided with the plate cutting device. A swinging device is coupled with the inclining device for changing the pointing direction of the cutting member with respect to the plate cutting direction. A cutting member holder is attached to the inclining device, for holding said cutting member so as to allow it to revolve with respect to the inclining device. Therefore, when the cutting member is swung and the hose or cord begins to twist, the holder will revolve and allow the hose or cord to untwist.

15 Claims, 3 Drawing Sheets

PLATE CUTTING DEVICE

FIELD OF THE INVENTION

The present invention relates to a plate cutting device having a gas cutting torch connected to a gas supply hose and an oxygen supply hose, or a plasma cutting torch connected to a plasma gas supply hose, a plasma power source cord, and a cooling water supply hose. The plate cutting device also has a swinging device which can prevent those hoses and cords from twisting when the torch is swung around a vertical axis orthogonal to a workpiece such as a plate.

BACKGROUND OF THE INVENTION

When cutting a steel plate or a stainless steel plate in a curved line, a numerical controlled plate cutting device is generally used. This plate cutting device has a moving stand (which runs on a track of the main body of the plate cutting device) and a cross-shifting stand (which shifts in a direction perpendicular to the moving stand's running direction). The cross-shifting stand has a vertical arm orthogonal to the surface of the plate, and a torch or torches for cutting the plate vertically or aslant (a bevel cut) are attached at the end of the arm. The plate cutting device also has a torch inclining device for inclining the torch to bevel angles, and a torch swinging device for maintaining the bevel angle in a direction normal to the tangential direction of the curved cutting line.

If the cutting torch is a gas cutting torch, the torch is coupled to a gas supply hose and an oxygen supply hose, the ends of which are connected to gas distributors disposed in the main body of the plate cutting device. If the cutting torch is a plasma cutting torch, the torch is coupled to plasma gas supply hose, a power source cord for supplying electricity to electrodes in the torch, and a cooling water supplying hose, the ends of which are also connected to gas distributors and an electric power source in the main body of the plate cutting device. As explained above, this kind of cutting torch always has hoses or cords the ends of which are fixed to the main body of the cutting device such as the moving stand.

When swinging such a plate cutting torch to keep it pointing in a direction normal to the tangential direction of the curved cutting line, the hoses and cords twist with the swing of the cutting torch. Because this twist biases the swinging device in a direction reverse to the direction of the swinging movement of the torch, there occurs the problem wherein the torch swinging device needs a powerful motor, or the swing range of the cutting torch is limited.

SUMMARY OF THE INVENTION

A plate cutting device according to the present invention is intended to solve the problems as set forth above, and it purposes is to prevent the twisting of hoses and cords which are coupled to the cutting torch when the torch is swung.

The hoses and cords of the cutting torch are elastic, so when swinging the cutting torch, such hoses and cords twist with the swing of the cutting torch. This twist is transmitted to the cutting torch, and then the cutting torch is allowed to revolve in the opposite direction of the twist to remove the twist. Thus, the plate cutting device according to the present invention needs a less powerful motor, and the swinging range of the torch becomes larger.

According to one aspect of the present invention, a plate cutting device having a cutting member for cutting a workpiece vertically or aslant comprises a stand, the cutting member coupled to a hose or a cord, an end of the hose or cord being connected to a part of said stand. An inclining device for inclining the cutting member about an axis parallel to a plate cutting direction is provided with the plate cutting device. A swinging device is coupled to the inclining device for keeping the cutting member pointing in a direction normal to the tangential direction of a curved plate cutting direction. A cutting member holder is attached to the inclining device and holds the cutting member so as to allow it to revolve.

DETAILED DESCRIPTION OF THE PREFERRED EMBODIMENT

The plate cutting device of the present invention will now be explained with reference to the drawings.

Figure 1:
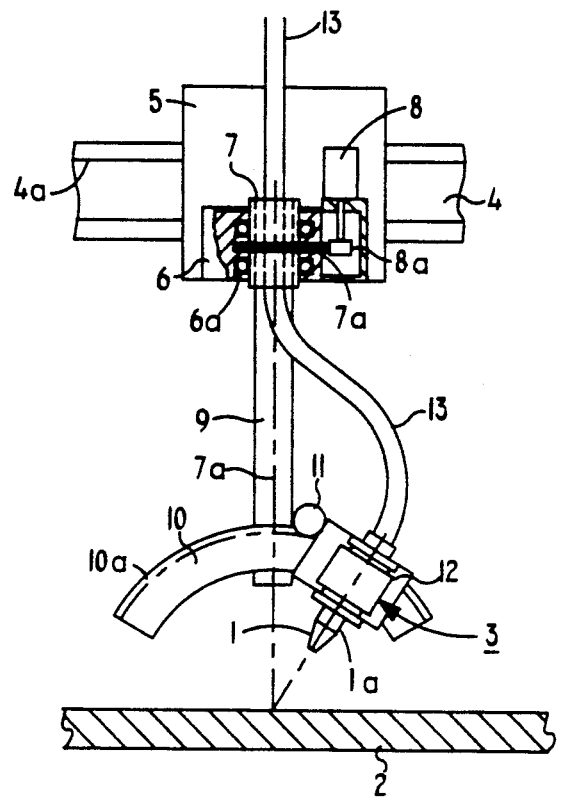
FIG. 1 is a front view of a plate cutting device according to the present invention.
Figure 2:
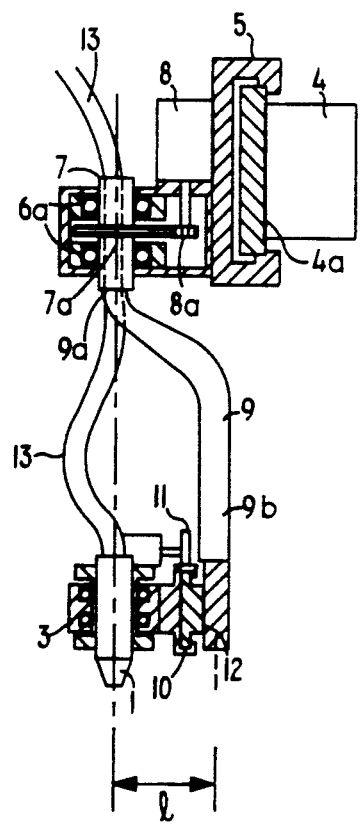
FIG. 2 is a side view of a plate cutting device according to the present invention.

A cutting torch 1 shown in FIG. 1 and FIG. 2 is a torch for cutting plate 2 vertically or aslant (such as a gas cutting torch or a plasma cutting torch). The cutting torch is attached to a torch holder 3 of a numerically controlled plate cutting device (the main body of the numerically controlled plate cutting device is not shown in the drawings) as described later.

The plate cutting device has a moving stand 4 and the moving stand 4 has a guide rail 4a for a cross-shifting stand 5. The moving stand 4 and the cross-shifting stand 5 are controlled in direction and speed by a computer (not shown in drawings) disposed on the main body of the plate cutting device. The plate cutting device can cut the steel plate along the cutting line by moving the stands 4, 5.

On the cross-shifting stand 5, a bracket 6 is fixed as shown in FIG. 1 and FIG. 2, and which has a bearings 6a holding a rotary axle 7. The rotary axle 7 is a tube and it has a round gear 7a on its circumference. The bracket 6 has a motor 8 having a gear 8a engaging the round gear 7a. The rotary axle 7 is rotated by motor 8.

At the bottom of axle 7, a swing arm 9 is fixed. The swing arm 9 is curved and extension lines of its upper end 9a and the lower 9b are parallel to each other (FIG. 2). At the lower end 9b of the arm 9, an arc rail 10 is fixed, and the upper edge of the arc rail 10 has a rack 10a. A saddle 12 is attached to the arc rail 10 so that it can shift along the arc rail 10, and the saddle 12 has a motor gear 11 to be coupled to the rack 10a. The arc rail 10, saddle 12, and motor gear 11 comprise a torch inclining device.

A torch holder 3 is attached to the saddle 12 so as to be inclined along the arc rail 10. The center of the radius of inclination set on an extension line of the rotary axle 7. A distance l between the tap end 9a of the arm 9 and the bottom end 9b will be set with respect to a distance of the cutting torch 1 from the plate 2.

The cutting torch 1 is coupled to at least one hose 13 and the middle portion of the hose 13 is routed inside the rotary axle 7. The distal end of the hose 13 is connected to the distributor (not shown in drawings) on moving stand 4.

Figure 3:
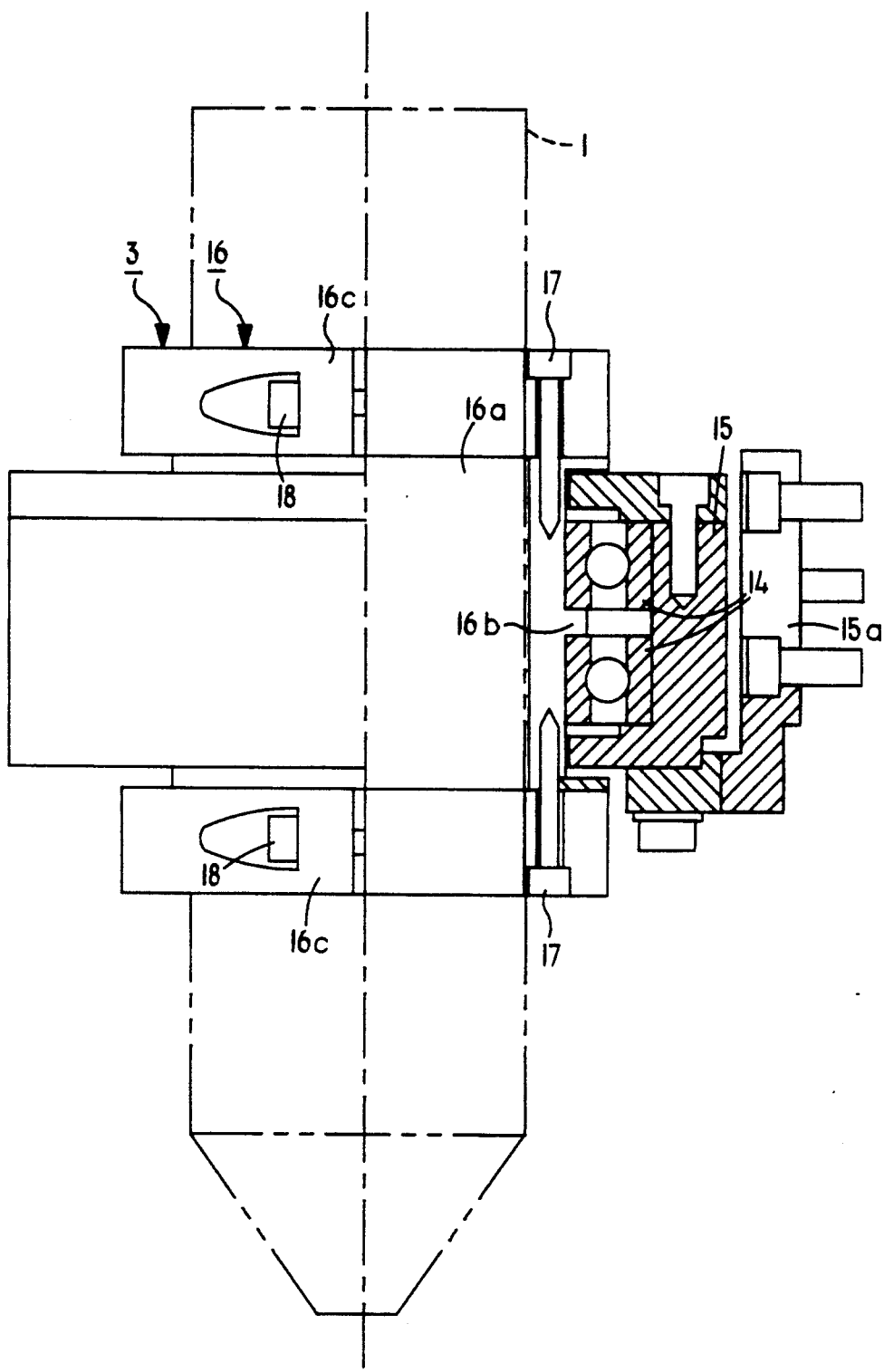
FIG. 3 is a side section view of a torch holder according to the present invention.
Figure 4:
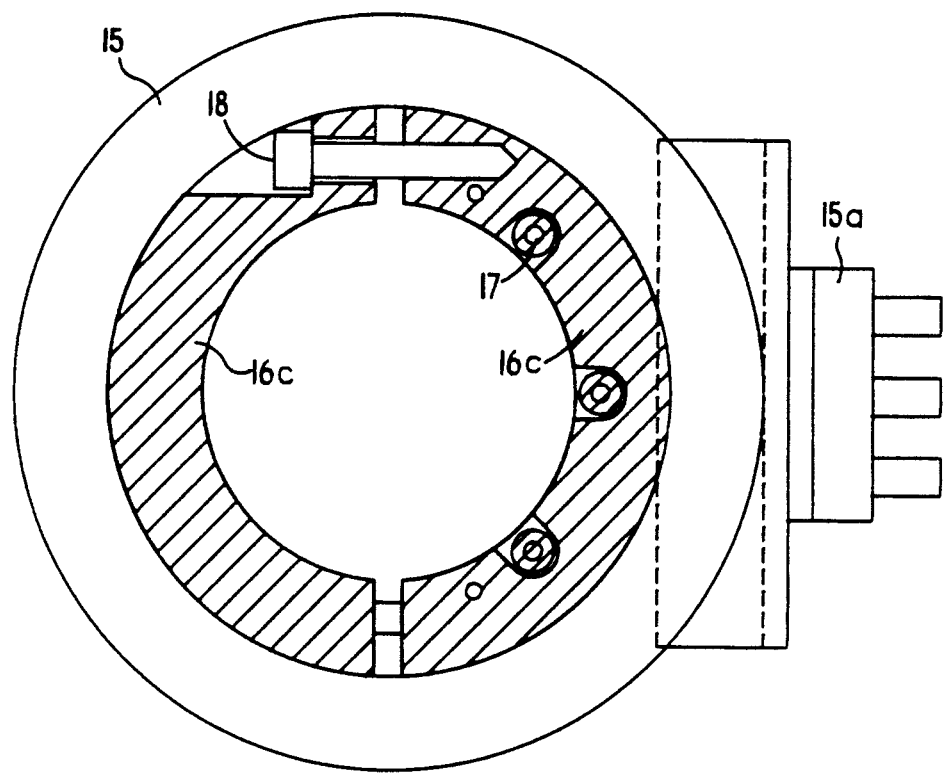
FIG. 4 is a top section view of a torch holder according to the present invention.

The torch holder 3 comprises a circular casing 15 holding a circular bearing 14 and an inner sleeve 16 coupled to the bearings 14 so that sleeve 16 can revolve with respect to casing 15, as shown in FIG. 3 and FIG. 4. The casing 15 has a bracket 15a to attach the torch holder 3 to the saddle 12.

The inner sleeve 16 itself comprises a sleeve main body 16a having a tube-shape, and half rings 16c disposed over and below the sleeve main body 16a. The main body 16a of the sleeve 16 also has a flange 16b to which the bearings 14 are coupled for supporting the weight of the cutting torch 1. The flange 16b will also be used as a spacer for the bearings 14. The sleeve main body 16a and half rings 16c are connected together by bolts 17, and the half rings 16c are connected to each other by bolts 18. Then, by tightening the bolts 17, 18 after putting the cutting torch 1 into the inner sleeve 16, the cutting torch 1 will be fixed to inner sleeve 16.

In the plate cutting device described above, by driving the motor gear 11 (FIG. 1), the cutting torch I inclines along the arc rail 10, and by driving the motor 8, the rotary axle 7 can rotate to change the direction in which the cutting torch 1 is pointed with respect to a line normal to a curved plate cutting direction.

With the swinging movement of the cutting torch 1, the hose 13 coupled to the cutting torch 1 twists at the same time. However, the cutting torch 1 is allowed to revolved with respect to the torch holder 3, and the twist in hose 13 will be removed.

Thus, the cutting torch will not be biased from the twist of the hose 13. In addition, because the hose 13 is routed through the inside of the rotary axle 7 and the hose 13 does not coil itself round the arm 9 when swinging the cutting torch 1, the cutting torch 1 can have a wide swinging range.

The individual components shown in outline or designated by blocks in the Drawings are well-known in the plate cutting arts, and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A plate cutting device having a cutting member for cutting a workpiece vertically or aslant, comprising:
   a stand;
   said cutting member coupled to a hose or a cord, an end of said hose being connected to said stand;
   an inclining device for inclining said cutting member about an axis parallel to a workpiece-cutting direction;
   a swinging device, coupled to said inclining device, for changing the pointing of said cutting member with respect to said workpiece-cutting direction; and
   a cutting member holder, attached to said inclining device, for holding said cutting member so as to allow said cutting member holder to revolve about an axis orthogonal to the workpiece, said cutting member holder comprising an (i) an inner sleeve holding said cutting member, and (ii) a bearing coupled to said inner sleeve so as to revolve said inner sleeve with respect to said inclining device, said inner sleeve comprising two pairs of half rings and a main body, and wherein said two pairs of half rings are respectively disposed over and under said main body, each pair of said half rings being connected together with means to fix said cutting member to said half rings.

2. A plate cutting device according to claim 1, wherein said swinging device comprises an arm coupled to said stand, and a motor gear for rotating said arm, said arm being coupled to said inclining device.

3. A plate cutting device according to claim 1, wherein said swinging device comprises:
   a rotary axle coupled to said stand;
   a gear for rotating said rotary axle; and
   an arm connected to said rotary axle and holding said inclining device, and
   wherein said rotary axle comprises a tube through which said hose or said cord is routed.

4. A plate cutting device according to claim 1, further comprising a motor gear for moving said stand.

5. A plate cutting device according to claim 1, wherein said inclining device comprises an arc rail and a saddle moving along said arc rail, and wherein said saddle is coupled to said cutting member holder.

6. A plate cutting device according to claim 1, wherein an inclining center of said cutting member intersects a swinging axis of said swinging device.

7. A plate cutting device according to claim 1, wherein said cutting member comprises a cutting torch.

8. Apparatus for holding a cutting member to prevent twist of a supply member coupled to the cutting member, comprising:
   a support stand;
   inclining structure, coupled to said stand, for inclining the cutting member about an axis which is parallel to a workpiece-cutting direction;
   swinging structure, coupled to said stand, for swinging the cutting member about an axis which is orthogonal to the workpiece, said swinging structure comprising (i) a support bracket coupled to said stand, (ii) a tubular support coupled to said inclining structure, the supply member being routed through an inside of said tubular support, and (iii) a bearing, disposed between said support bracket and said tubular support, for allowing said tubular support to rotate with respect to said support bracket; and
   a cutting member holder, coupled to said inclining structure, for allowing the cutting member to rotate freely about an axis which is parallel to a pointing direction of the cutting member to prevent twisting of the supply member.

9. Apparatus according to claim 8, further comprising: p1 the cutting member, coupled to said cutting member holder, for cutting the workpiece; and
   at least one supply member coupled to said cutting member.

10. Apparatus according to claim 8, wherein said cutting member holder comprises:

at least one split ring adapted to be fixed to the cutting member;

a support member coupled to said inclining structure; and a bearing, disposed between said split ring and said support member, for allowing said split ring to rotate with respect to said support member.

11. Apparatus according to claim 8, wherein said tubular support is bent such that an axis of a top portion of said tubular support is parallel to but not colinear with an axis of a bottom portion of said tubular support.

12. A plate cutting apparatus comprising:

a cutting member for cutting a workpiece in a plate-cutting direction;

a supply member coupled to said cutting member;

a support stand for holding said cutting member;

a swinging device, coupled to said stand, for swinging a pointing direction of said cutting member about an axis orthogonal to the workpiece;

an inclining device, coupled to said swinging device, for inclining the pointing direction of said cutting member about an axis parallel to said plate-cutting direction; and a rotatable support member disposed between said cutting member and said inclining device to allow said cutting member to rotate about an axis parallel to its pointing direction to prevent twisting of said supply hose member when said cutting member is swung or inclined by said swinging device or said inclining device, said rotatable support member comprising (i) a rotatable member coupled to said cutting member, (ii) a support bracket coupled to said inclining device, (iii) a bearing disposed between said rotatable member and said support bracket to allow said rotatable member to rotate with respect to said support bracket, (iv) at least one split ring, and (v) coupling means for coupling together portions of the split ring.

13. Apparatus according to claim 12, wherein said swinging device comprises:

a support bracket coupled to said stand;

a motor for rotating said support bracket about an axis orthogonal to the workpiece; and a tubular arm coupled to said support bracket, said supply member being routed through an interior of said tubular arm.

14. Apparatus according to claim 13, wherein said tubular arm is bent such that an axis of a tap portion of said arm is noncolinear with an axis of a bottom portion of said arm.

15. Apparatus according to claim 12, wherein said inclining device comprises:

a bracket coupled to said cutting member;

an arcuate member arched about an axis parallel to said plate cutting direction; and a motor for moving said bracket along said arcuate member.

* * * * *